C. E. PAGE.
Hand Mirror.
No. 229,909. Patented July 13, 1880.
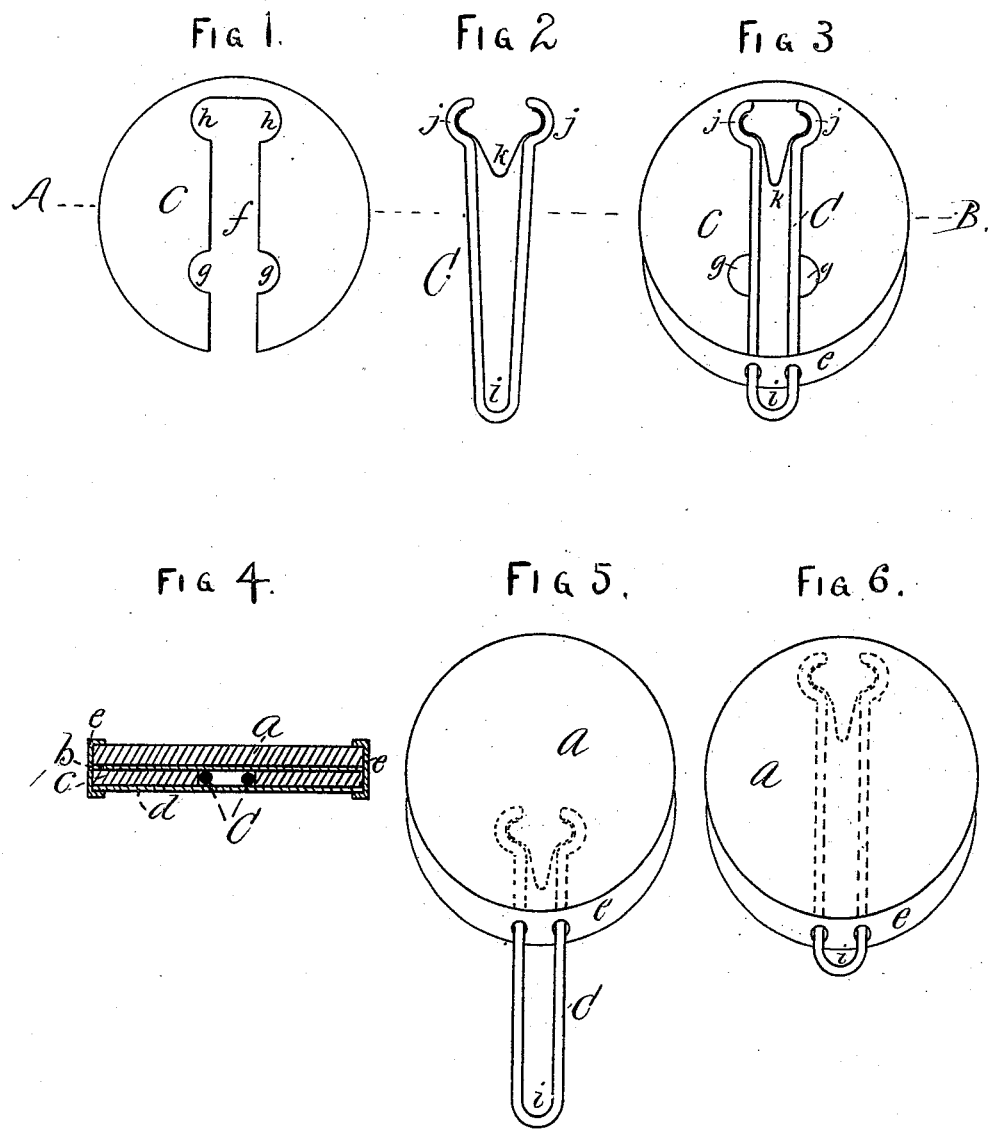
WITNESSES.
Samuel D. Kelly.
INVENTOR.
Charles E. Page
By Porter & Hutchinson
Attys.

UNITED STATES PATENT OFFICE.

CHARLES E. PAGE, OF BIDDEFORD, MAINE.

HAND-MIRROR.

SPECIFICATION forming part of Letters Patent No. 229,909, dated July 13, 1880.

Application filed September 11, 1879.

*To all whom it may concern:*

Be it known that I, CHARLES E. PAGE, of Biddeford, State of Maine, have invented Improvements in Hand-Mirrors, of which the following is a specification.

The object of my invention is to effect an improvement upon the mirror for which Letters Patent of the United States were issued to me on the 12th day of August, 1879, and which are numbered 218,396; and my present invention consists in the method of connecting the handle with the body of the mirror, so as to render such handle adjustable in the degree of its projection from the inclosing-rim, so that it may be adjusted to serve as a handle when used as a hand-mirror, and as a ring simply when used as a shaving-glass or for convenience in packing for transportation, all as will, by the aid of the annexed drawings, be hereinafter fully described.

Figure 1 is a plan view of the interior slotted disk, in which the handle interlocks. Fig. 2 is a plan view of the handle. Fig. 3 is a perspective view of the slotted disk, the handle, and a section of the inclosing-rim, an actuating-spring being shown as attached to the handle. Fig. 4 is a vertical section taken through the mirror as complete, and as on line A B, Figs. 1, 2, 3. Fig. 5 is a perspective view of the mirror complete as adjusted for a hand-mirror, the connection of the handle with the disk being shown by dotted lines. Fig. 6 is a view like Fig. 5, except that the handle is shown as constituting a suspending-ring merely.

In these figures, $a$ represents the reflecting-plate of the mirror. $b$ is a thin metallic plate that protects the interior face of the reflecting-plate. $c$ is the slotted or handle plate. $d$ is the back plate, and $e$ is the inclosing-rim. These parts having been fully described in my said former patent, need not be further here described, except the slot or passage in plate $c$, which I form, as shown in Fig. 1, with the straight part $f$ and the intermediate side recesses, $g$ $g$, and the enlargements $h$ $h$ at the inner end, such slot and its side enlargements being punched or cut directly through the disk.

The handle C is formed from a single piece of wire, and with the bow $i$ and the inturned jaws $j$ $j$, which extend laterally beyond the side lines of the bow-arms to an extent corresponding with the depth of the indentures $g$ $g$ and $h$ $h$, beyond the side lines of slot $f$, so that when the handle is in the position shown in Figs. 3 and 6 the jaws $j$ will be seated in the recesses $h$ $h$, and the handle will be thereby held, serving as a suspending-ring for the mirror; but by springing the jaws together by pressing upon the arms of bow $i$, the jaws will be liberated from the recesses and the handle may be drawn out till the jaws engage in recesses $g$ $g$, when the handle will be thereby held, and will then serve as a convenient handle.

The holes in rim $e$, in which the handle is inserted, are slightly elongated to allow the requisite but slight lateral movement of the handle therein when disengaging the jaws $j$ from recesses $g$ or $h$.

The handle may be formed of steel or spring-rolled wire, or an auxiliary spring, as shown at $k$, may be connected with it to insure its engagement in the recesses in disk $c$.

It is evident that the form of the handle and of the recessed slot shown and described is not indispensable to the embodiment of the spirit of my invention, but that a variety of modifications thereof may be employed, if for any purpose desired.

I claim as my invention—

1. The hand-mirror having within its body a series of recesses at different distances from its bottom and provided with a handle entering said body and interlocking with said recesses, whereby such handle may be adjusted in such body to vary its extent of projection from the body of the mirror, substantially as specified.

2. In a hand-mirror, the slotted disk $c$, having the recesses $g$ $h$, in conjunction with slot $f$, and at different distances from the open end of said slot, in combination with the elastic handle C, having the jaws $j$, corresponding with and to engage in such recesses and to be adjusted or changed therein, substantially as specified.

CHARLES E. PAGE.

Witnesses:
T. W. PORTER,
EBEN HUTCHINSON.